(12) United States Patent
Eom et al.

(10) Patent No.: US 11,472,702 B2
(45) Date of Patent: Oct. 18, 2022

(54) METHOD OF PURIFYING WASTE HYDROCHLORIC ACID

(71) Applicant: LG CHEM, LTD., Seoul (KR)

(72) Inventors: Hee Jun Eom, Daejeon (KR); Dong Chul Lee, Daejeon (KR); Yeon Yi Kim, Daejeon (KR); Jung Ho Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 489 days.

(21) Appl. No.: 15/774,915

(22) PCT Filed: Oct. 25, 2017

(86) PCT No.: PCT/KR2017/011869
§ 371 (c)(1),
(2) Date: May 9, 2018

(87) PCT Pub. No.: WO2018/088727
PCT Pub. Date: May 17, 2018

(65) Prior Publication Data
US 2020/0270132 A1 Aug. 27, 2020

(30) Foreign Application Priority Data

Nov. 9, 2016 (KR) .................. 10-2016-0148633
Oct. 24, 2017 (KR) .................. 10-2017-0138499

(51) Int. Cl.
*C01B 7/07* (2006.01)
*B01D 11/04* (2006.01)

(52) U.S. Cl.
CPC ........ *C01B 7/0737* (2013.01); *B01D 11/0484* (2013.01); *B01D 11/0492* (2013.01); *B01D 2257/60* (2013.01); *C01P 2006/80* (2013.01)

(58) Field of Classification Search
CPC ..... C01B 7/01; C01B 7/0737; C01G 49/0009; C23G 1/36
See application file for complete search history.

(56) References Cited

U.S. PATENT DOCUMENTS 2,787,525 A 4/1957 De Witt
4,971,780 A 11/1990 Spitz
(Continued)

FOREIGN PATENT DOCUMENTS

CN 105696010 A 6/2016
FR 2823195 A1 10/2002
(Continued)

OTHER PUBLICATIONS

Farouq et al, "Solvent Extraction of Iron Ions from Hydrochloric acid solutions, Journal of the Chilean Chemical Society", vol. 62, No. 2, Jun. 2017 (Year: 2017).*
(Continued)

*Primary Examiner* — Ngoc-Yen Nguyen
(74) *Attorney, Agent, or Firm* — Dentons US LLP

(57) ABSTRACT

The present invention relates to a method of purifying waste hydrochloric acid, and more particularly, to a method of purifying waste hydrochloric acid which includes preparing an extraction solution by dissolving an extractant in an organic solvent (S1), extracting metallic components with the organic solvent by adding the extraction solution to the waste hydrochloric acid (S2), separating a waste hydrochloric acid layer and the organic solvent containing the metallic components (S3), and obtaining purified hydrochloric acid by recovering the separated (fractionated) waste hydrochloric acid layer (S4), wherein the extractant is used in an amount of 40 moles or more based on 1 mole of iron (Fe)

(Continued)

included in the waste hydrochloric acid, and the waste hydrochloric acid and the extraction solution are mixed in a volume ratio of 1:0.1 to 1:1.

12 Claims, 3 Drawing Sheets

(56) References Cited

U.S. PATENT DOCUMENTS

| | | | |
|---|---|---|---|
| 5,009,868 A | 4/1991 | Spitz et al. | |
| 5,078,887 A | 1/1992 | Voit | |
| 5,756,063 A * | 5/1998 | Nuernberg | C01B 7/0706 423/488 |
| 2005/0058670 A1* | 3/2005 | Woo | A61K 9/4858 424/400 |
| 2015/0104361 A1* | 4/2015 | Boudreault | C22B 3/42 423/21.5 |
| 2019/0084838 A1* | 3/2019 | Xie | C01G 23/001 |

FOREIGN PATENT DOCUMENTS

| | | |
|---|---|---|
| JP | 52115796 A | 9/1977 |
| JP | 3511244 B | 3/2004 |
| JP | 2010180430 A | 8/2010 |
| KR | 1019890000355 A | 3/1989 |
| KR | 1020160038562 A | 4/2016 |
| WO | 9109810 A | 7/1991 |

OTHER PUBLICATIONS

Rydberg, Jan, Sovent Extraction Principles and Practice, Revised and Expanded, 2004, Chapters 1 and 5 (Year: 2004).*

"Study on the Process of Extracting Iron-containing Waste Hydrochloric Acid with N235", Zhang, Yinsheng etc., Mining and Metallurgy, vol. 11 Period IV, pp. 66-68 (Dec. 31, 2002).

W. Smuek et al: "The influence of diluent on the extraction of iron(III) from hydrochloric acid solutions by tertiary amines", Journal of Inorganic and Nuclear Chemistry, vol. 24, No. 12, Dec. 1, 1962, p. 1651-1666, XP055630404.

A.V.L.S.H Hariharan et al: "Studies on the Solvent Extraction of Iron(III) with Tri-iso-octylamine from Aqueous Mineral Acid Solutions", Oriental Journal of Chemistry, Nov. 11, 2012, XP055630402, Retrieved from the Internet: URL:http://www.orientjchem.org/vol28no4/studies-on-the-solvent-extraction-of-ion-iii-with-tri-iso-octylamine-from-aqueous-mineral-acid-solutions/.

Katarzyna Staszak et al: "Equilibrium and rate of iron(III) extraction from chloride solutions by individual hydrophobic extractants and their mixtures", Polish Journal of Chemical Technology, vol. 13, No. 1, Mar. 17, 2011, p. 1-5, XP055630394.

Lee M S et al: "Separation of iron and nickel from a spent FeCl"3 etching solution by solvent extraction", Hydrometallurgy, Elsevier Scientific Publishing CY. Amsterdam, NL, vol. 30, No. 3, Dec. 1, 2005, p. 163-169, XP027652579.

Yan, Zhongqing and Wang Jinsen. "Preparation of Chemical Metallurgical Products from Scrap Alloy Steel," National Materials Bureau Metal Recycling Bureau, Nov. 1992, pp. 1-4.

* cited by examiner

METHOD OF PURIFYING WASTE HYDROCHLORIC ACID

CROSS-REFERENCE TO RELATED APPLICATIONS

This application is a National Stage Application of International Application No. PCT/KR2017/011869, filed Oct. 25, 2017, and claims the benefit of Korean Patent Application No. 10-2016-0148633, filed Nov. 9, 2016, and Korean Patent Application No. 10-2017-0138499, filed Oct. 24, 2017, contents of which are incorporated herein by reference in their entirety for all purposes as if fully set forth below.

Technical Field

The present invention relates to a method of purifying waste hydrochloric acid.

BACKGROUND ART

Ethylene dichloride (EDC, 1,2-dichloroethane), as a material generated during a vinyl chloride monomer synthesis reaction (see the following Scheme 1), may be prepared using a direct chlorination method by reaction of ethylene and chlorine and using an oxychlorination method by reaction of ethylene, hydrogen chloride, and air (oxygen).

$C_2H_4 + Cl_2$ (or HCl) → $CH_2$=$CHCl + CH_2ClCH_2Cl$ $CH_2ClCH_2Cl$ → $CH_2$=$CHCl + HCl$ [Scheme 1]

A predetermined amount of a byproduct, such as waste hydrochloric acid (or dilute hydrochloric acid), is continuously generated during the production of the ethylene dichloride.

In a case in which the waste hydrochloric acid is recycled as hydrochloric acid that is added to an anolyte of a chlor-alkali electrolytic cell, or is recycled as a raw material for oxy-chlorination, environmental and economic benefits may occur due to reductions in the amount of hazardous substances emitted from factories and the cost of purchasing hydrogen chloride. Thus, in order to reduce manufacturing costs, a method of recycling waste hydrochloric acid through purification has been variously studied.

Various metallic components, such as iron (Fe), aluminum (Al), calcium (Ca), potassium (K), magnesium (Mg), and nickel (Ni), remaining in waste hydrochloric acid must be removed to recycle the waste hydrochloric acid. In a case in which cations of the metals as described above are present in the anolyte, since the cations are reacted with $OH^-$ ions on the surface or inside of a membrane in the electrolytic cell to generate hydroxides, it may cause an increase in voltage and a decrease in current efficiency.

In particular, most of the metallic components other than Fe are removed when water used in an ethylene dichloride process is replaced by de-minerals water, but, since the Fe still remains even if the water is replaced, an additional purification process is required to remove the Fe in the waste hydrochloric acid.

Currently, the most common method of removing Fe is a method of separating $FeCl_3$ using an ion exchange resin, after a free residual chlorine component present in the waste hydrochloric acid is removed.

Since the free residual chlorine present in the waste hydrochloric acid causes serious deactivation of active sites of the ion exchange resin, a process of first removing the free residual chlorine must be performed before performing the Fe purification process.

As a method of removing the free residual chlorine, a vacuum dechlorination method, a steam/air stripping method, a sulfite addition method, a method of using active carbon, or an ultraviolet (UV) method may be used.

The vacuum dechlorination method is a method of removing $Cl_2$ by pressure control, wherein it may be combined with a typical anolyte dechlorination method. However, it is disadvantageous in that the process is complicated, process costs are high, and removal efficiency is low. The steam/air stripping method is a stripping method using steam or air, wherein it is disadvantageous in that energy consumption is large and an additional investment cost is needed. Also, the sulfite addition method is a process of reducing $Cl_2$ by an oxidation reaction of sulfite, such as $Na_2SO_3$ and $NaHSO_3$, to sulfate as in the following Scheme 2, wherein this method also has low free residual chlorine removal efficiency, and a sulfate treatment in a conventional sulfate removal system (SRS) may be overloaded.

$NaHSO_3 + HOCl$ → $NaHSO_4 + HCl$ [Scheme 2]

The method of using active carbon is a method of adsorbing $Cl_2$ using activated carbon, wherein there may be inconvenience in that efficiency in a strong acid environment must be considered and it must be considered whether or not it is a gas object or a liquid object.

The UV method is a process of selectively removing the free residual chlorine by using UV energy as in the following Scheme 3, wherein it has been reported that HOCl is well absorbed at a wavelength of 238 nm. However, this method is also disadvantageous in that process costs are increased and free residual chlorine removal efficiency is low.

$Cl_2 + H_2O$ → $HOCl + HCl$ $2HOCl$ → $O_2 + 2HCl$ [Scheme 3]

As described above, various methods for removing the free residual chlorine before the Fe removal are proposed, but, in a case in which pH is very low, at 0.8 or less, as in the waste hydrochloric acid, it may not be easy to remove the free residual chlorine to a concentration of less than 5 ppm.

Also, with respect to the common method of separating $FeCl_3$ using the ion exchange resin, since water having the free residual chlorine removed therefrom is recycled by being swung and used, a two-step purification process is required. Thus, since process equipment and maintenance costs are increased, there is a difficulty in applying the method to the actual process.

As described above, with respect to the typical method of removing Fe from the waste hydrochloric acid, since process steps are complicated, energy consumption and costs may not only be high, but efficiency of removing the free residual chlorine from the waste hydrochloric acid may also be low.

Thus, there is a need to reduce the energy consumption and costs and develop a method of highly purifying waste hydrochloric acid at the same time.

PRIOR ART DOCUMENT (Patent Document 1) U.S. Pat. No. 2,787,525
(Patent Document 2) Japanese Patent No. 3511244

DISCLOSURE OF THE INVENTION

Technical Problem

An aspect of the present invention provides a method of purifying waste hydrochloric acid using a solvent extraction method.

Technical Solution

According to an aspect of the present invention, there is provided a method of purifying waste hydrochloric acid including the steps of:

preparing an extraction solution by dissolving an extractant in an organic solvent (S1);

extracting metallic components in waste hydrochloric acid with the organic solvent by adding the extraction solution to the waste hydrochloric acid (S2);

separating a waste hydrochloric acid layer and the organic solvent containing the metallic components (S3); and obtaining purified hydrochloric acid by recovering the separated (fractionated) waste hydrochloric acid layer (S4), wherein an amount of the extractant used is 40 moles or more based on 1 mole of an iron (Fe) ion component of the metallic components contained in the waste hydrochloric acid, and the waste hydrochloric acid and the extraction solution are mixed in a volume ratio of 1:0.1 to 1:1.

In the method of purifying waste hydrochloric acid of the present invention, the organic solvent used for the preparation of the extraction solution may include at least one solvent selected from the group consisting of an aromatic hydrocarbon solvent, an aliphatic hydrocarbon solvent, and an alcohol.

Specifically, the aromatic hydrocarbon solvent may include at least one selected from the group consisting of toluene and xylene.

The aliphatic hydrocarbon solvent may include at least one alicyclic hydrocarbon solvent selected from the group consisting of methyl cyclohexane and cyclohexane, or a linear hydrocarbon solvent having 6 to 20 carbon atoms, for example, at least one selected from the group consisting of kerosene, N-hexane, heptane, octane, nonane, decane, and dodecane.

The alcohol may include a monovalent alcohol having 6 to 20 carbon atoms.

Also, the extractant may include at least one selected from the group consisting of trioctylamine, methyl isobutyl ketone, trialkylphosphine oxide, and tributyl phosphate, may particularly include at least one selected from the group consisting of trioctylamine and methyl isobutyl ketone, and, more particularly, may include trioctylamine.

An amount of the extractant used may be in a range of 40 moles to 60 moles based on 1 mole of the iron (Fe) ion component of the metallic components contained in the waste hydrochloric acid.

Advantageous Effects

As described above, with respect to a method of purifying waste hydrochloric acid using a solvent extraction method according to the present invention, since the method may effectively remove a metallic component, particularly, an iron (Fe) ion component, from the waste hydrochloric acid to a concentration of 1 ppm or less, recycling efficiency of hydrochloric acid may be improved.

Also, with respect to the method of purifying waste hydrochloric acid using a solvent extraction method of the present invention, since a solvent may be repeatedly used several times by the regeneration of the solvent used, a process may be simplified in comparison to a conventional process, and a resulting effect of reducing energy and manufacturing costs may be obtained.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

With respect to a conventional method of removing a metallic component, particularly, an iron (Fe) ion component, from waste hydrochloric acid, since process steps are complicated, for example, a step of removing free residual chlorine is included, energy and cost consumption may not only be high, but efficiency of removing the free residual chlorine and Fe ion component from the waste hydrochloric acid may also be low.

Thus, the present invention aims at providing a method which may reduce energy consumption and costs and may highly purify waste hydrochloric acid at the same time by effectively removing the metallic component, particularly, the iron (Fe) ion component, to a concentration of 1 ppm or less, for example, 0.1 ppm or less, using a solvent extraction method without further performing the step of removing a free residual chlorine component from the waste hydrochloric acid.

Specifically, in an embodiment of the present invention, provided is a method of purifying waste hydrochloric acid including the steps of:

preparing an extraction solution by dissolving an extractant in an organic solvent (S1);

extracting metallic components in waste hydrochloric acid with the organic solvent by adding the extraction solution to the waste hydrochloric acid (S2);

separating a waste hydrochloric acid layer and the organic solvent containing the metallic components (S3); and obtaining purified hydrochloric acid by recovering the separated (fractionated) waste hydrochloric acid layer (S4), wherein an amount of the extractant used is 40 moles or more based on 1 mole of an iron (Fe) ion component of the metallic components contained in the waste hydrochloric acid, and the waste hydrochloric acid and the extraction solution are mixed in a volume ratio of 1:0.1 to 1:1.

Figure 1:
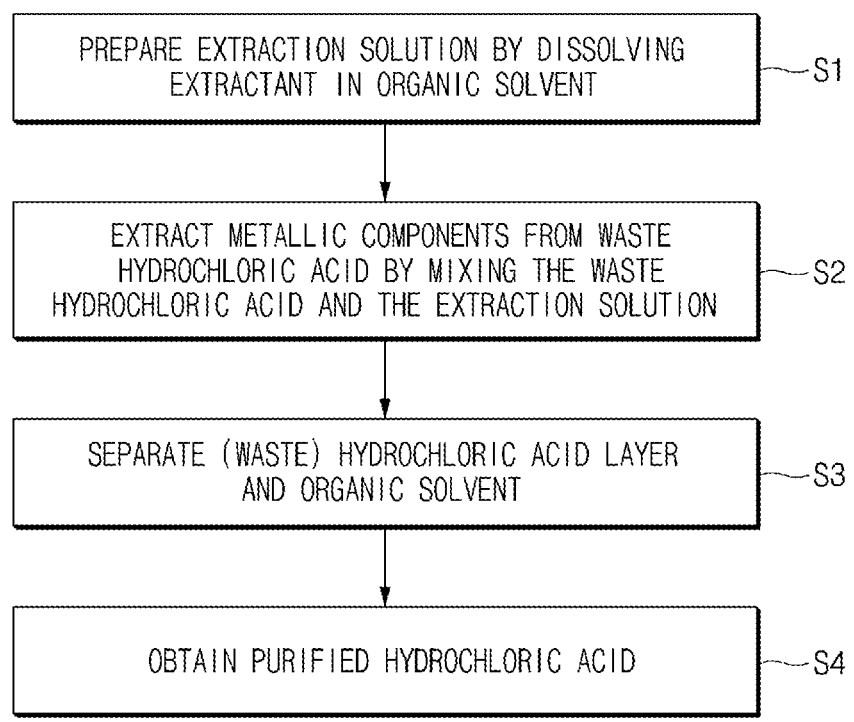
FIG. 1 is a flowchart for explaining a method of purifying waste hydrochloric acid using a solvent extraction method of the present invention.
Figure 2:
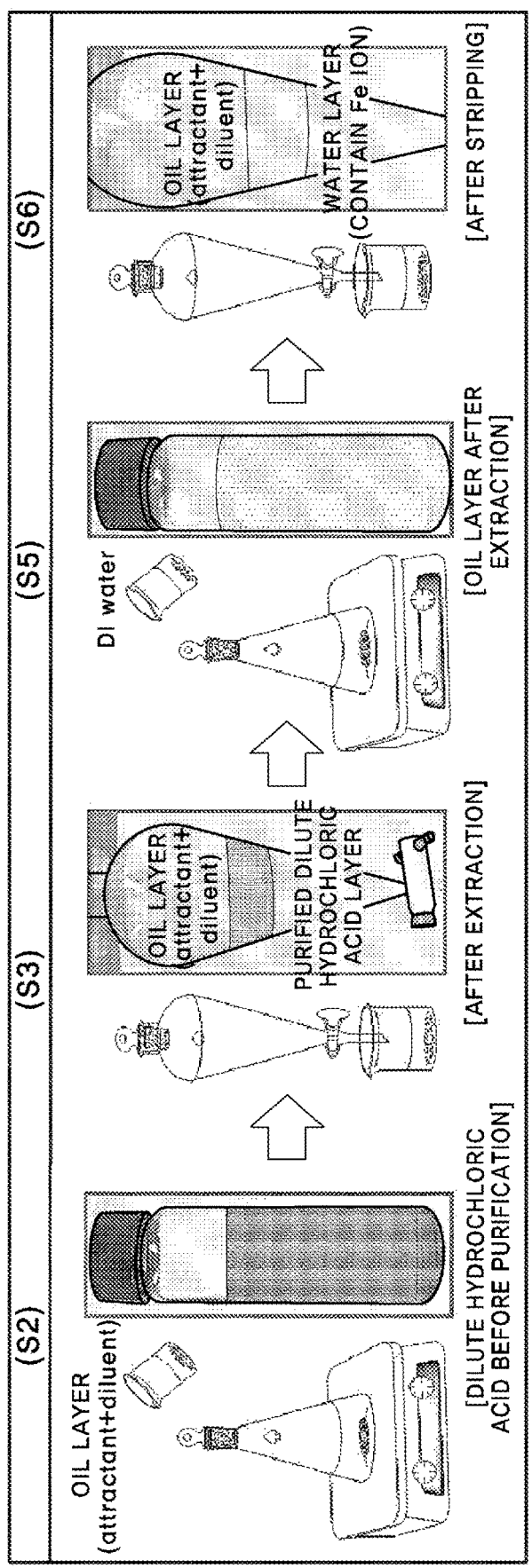
FIG. 2 is a schematic process diagram of the method of purifying waste hydrochloric acid using a solvent extraction method of the present invention.

Specifically, FIG. 1 is a flowchart for explaining the method of purifying waste hydrochloric acid using a solvent extraction method of the present invention according to exemplary embodiments. FIG. 2 is a schematic process diagram of the method of purifying waste hydrochloric acid using a solvent extraction method of the present invention.

First, the method of purifying waste hydrochloric acid of the present invention may further include a step of measuring a concentration of the Fe ion component of the metallic components contained in the waste hydrochloric acid (S0), before the preparing of the extraction solution (S1).

In this case, the concentration of the Fe ion component of the metallic components contained in the waste hydrochloric acid may be measured by inductively coupled plasma mass spectrometry. Specifically, after about 5 g of a sample was weighed and put in a Corning tube, as an internal standard, and diluted with 25 ml of ultrapure water, the sample was analyzed by using an inductively coupled plasma-optical emission spectrometer (ICP-OES) (Optima 7300 DV).

Also, referring to FIG. 1, the method of purifying waste hydrochloric acid of the present invention may include a step of preparing an extraction solution by dissolving an extractant in an organic solvent (S1).

In this case, the organic solvent is a (dilution) solvent used to improve physical properties, such as viscosity and specific gravity, of an organic phase and adjust the concentration of a predetermined amount of the extractant, wherein typical examples of the organic solvent may include at least one solvent selected from the group consisting of an aromatic hydrocarbon solvent, an aliphatic hydrocarbon solvent, and an alcohol.

Specifically, the aromatic hydrocarbon solvent may include at least one selected from the group consisting of toluene and xylene.

The aliphatic hydrocarbon solvent may include at least one alicyclic hydrocarbon solvent selected from the group consisting of methyl cyclohexane and cyclohexane, or a linear hydrocarbon solvent having 6 to 20 carbon atoms, specifically, at least one selected from the group consisting of kerosene, N-hexane, heptane, octane, nonane, decane, and dodecane.

Also, the alcohol may include a monovalent alcohol having 6 to 20 carbon atoms, and typical examples thereof may be 2-ethylhexanol or 2-dodecanol.

The organic solvent may be affected by extraction equilibrium and extraction rate depending on a content of hydrocarbon, wherein, specifically, as the organic solvent, it is desirable to use toluene which exhibits the lowest total organic carbon (TOC) value after the extraction process because phase separation with water is smooth and selectivity to metal is higher than water.

In this case, the expression "TOC value" denotes a value by which how much extractant or diluent is included may be determined by checking a concentration of organic impurities included in purified high-purity hydrochloric acid after the extraction process.

Furthermore, the extractant is a compound for an ion exchange reaction, wherein, as a typical example thereof, at least one selected from the group consisting of trioctylamine, methyl isobutyl ketone, trialkylphosphine oxide, and tributyl phosphate may be used, and, among these compounds, it is desirable to use the trioctylamine and methyl isobutyl ketone in which a phase separation effect may not only be higher than that of the trialkylphosphine oxide or tributyl phosphate, as a phosphorous-based extractant, but also the metallic component, particularly, the iron (Fe) ion component, in the waste hydrochloric acid may be easily removed, the organic solvent used in the purification process may be reused, and resultant cost-saving effect may be obtained. For example, the trioctylamine may be used.

Examples of a current commercial extractant may be Alamine 336 or Aliquat 336, as a nitrogen-based extractant (containing trioctylamine), or Cyanex 923 as a phosphorous-based extractant (containing trialkylphosphine oxide), and these extractants may be used alone or in combination thereof.

An amount of the extractant used may be in a range of 40 moles or more, particularly 40 moles to 60 moles, and more particularly 40 moles to 50 moles, for example, 40 moles to 45 moles, based on 1 mole of the iron (Fe) ion component of the metallic components contained in the waste hydrochloric acid.

In a case in which the amount of the extractant used is less than 40 moles, the effect of removing the metallic component, particularly, the Fe ion component may be insignificant. Also, in a case in which the amount of the extractant used is greater than 60 moles, there is no significant difference in the effect of removing the metallic component, particularly, the Fe ion component, but, since a large amount of the extractant may be used, manufacturing costs may be increased. Thus, the extractant may be used in an amount of 60 moles or less in consideration of appropriate manufacturing costs and Fe ion component removal efficiency.

Subsequently, referring to FIGS. 1 and 2, in the method of purifying waste hydrochloric acid of the present invention, after the waste hydrochloric acid is put into a reaction vessel, a step of extracting metallic components contained in waste hydrochloric acid with the organic solvent (S2) may be performed while adding and stirring the extraction solution.

In this case, an iron ion component is mainly included in the metallic components contained in the waste hydrochloric acid, and, in addition, metallic components, such as $Al^{3+}$, $Ca^{2+}$, $K^+$, $Mg^{2+}$, and $Ni^{2+}$, may be further included.

Also, the waste hydrochloric acid and the extraction solution may be mixed in a volume ratio of 1:0.1 to 1:1, for example, 1:1. In a case in which the extraction solution is added to the waste hydrochloric acid at a volume ratio of less than 0.1 (1/10), since an emulsion may be generated in the waste hydrochloric acid layer, phase separation may not be possible. Furthermore, in a case in which the extraction solution is added at a volume ratio of greater than 1, process costs may be increased.

The extracting (S2) may be performed for 10 seconds to 60 seconds, for example, 20 seconds to 60 seconds at atmospheric temperature while stirring a mixed solution of the waste hydrochloric acid and the extraction solution at a speed of 200 rpm to 600 rpm.

In this case, the expression "atmospheric temperature", as an annual average normal temperature or an ambient temperature, specifically denotes a temperature range of 20±5° C.

In a case in which the stirring speed is less than 200 rpm, since the mixing is not done smoothly, the extraction efficiency of the metallic component or the iron ion component may be reduced. Also, in a case in which the stirring speed is greater than 600 rpm, the effect of extracting the metallic components is insignificant, but energy consumption may be increased.

Furthermore, in a case in which the stirring time is less than 10 seconds, since sufficient time to extract metals is not secured, the metallic component extraction efficiency may be reduced. An amount of the extracted metallic component may not be significantly different even if the stirring time is greater than 60 seconds, but an amount of the processable waste hydrochloric acid is limited, and thus, process time and costs may be increased.

In the stirring, various mixing devices may be used, and, as a typical example, the stirring may be performed by using a magnetic stirrer plate or a static mixer.

Figure 3:
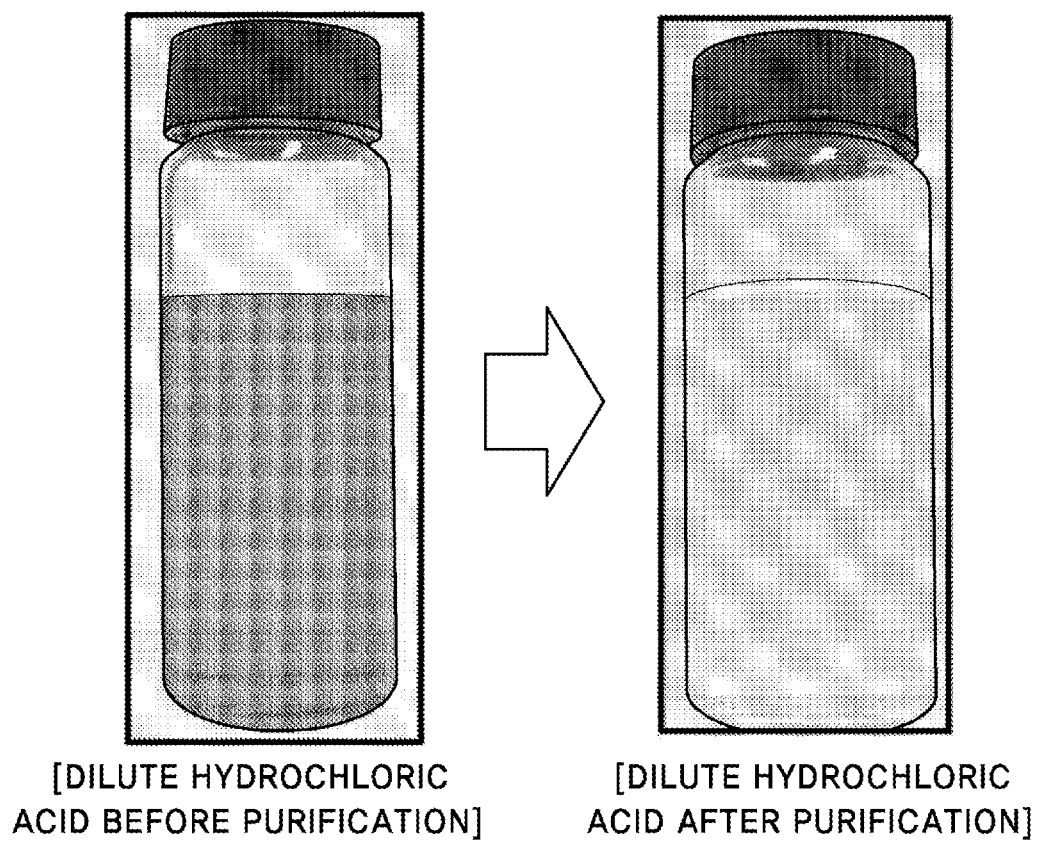
FIG. 3 illustrates images in which changes in colors of hydrochloric acids are compared before and after the purification of the waste hydrochloric acid which is purified by using the solvent extraction method of the present invention.

In the extracting (S2) of the method of the present invention, since $FeCl_4^-$ and $FeCl_3$, as components having a yellow color, as well as the metallic components, specifically, the Fe ion component, contained in the waste hydrochloric acid are removed (see the following Scheme 4), it may be confirmed that color of the high-purity hydrochloric acid obtained after the purification changes to transparent (see FIG. 3).

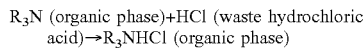
$R_3N$ (organic phase)+HCl (waste hydrochloric acid)→$R_3NHCl$ (organic phase)

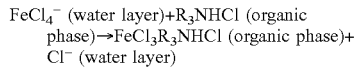
$FeCl_4^-$ (water layer)+$R_3NHCl$ (organic phase)→$FeCl_3R_3NHCl$ (organic phase)+ $Cl^-$ (water layer)

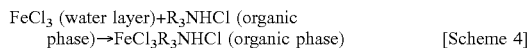
$FeCl_3$ (water layer)+$R_3NHCl$ (organic phase)→$FeCl_3R_3NHCl$ (organic phase) [Scheme 4]

Next, referring to FIGS. 1 and 2, in the method of purifying waste hydrochloric acid of the present invention, after the stirring has reached equilibrium, the mixed solution of the organic solvent and the waste hydrochloric acid is put into a separator, shaken, and then settled so that the mixed solution is separated (fractionated) into an organic solvent containing the metallic components, as a residual phase, and a waste hydrochloric acid layer as an extract (S3).

In this case, the mixing for the phase separation may be performed within 20 seconds.

Subsequently, referring to FIGS. 1 and 2, in the method of purifying waste hydrochloric acid of the present invention, purified hydrochloric acid may be obtained by recovering the waste hydrochloric acid layer, as the extract separated in the separating (S3) and disposed on a lower end (S4).

In this case, since the metallic component, particularly, the iron (Fe) ion component, is effectively removed from the purified hydrochloric acid, the iron (Fe) ion component may remain in the purified hydrochloric acid at a concentration of 1 ppm or less, for example, 0.1 ppm or less.

Also, referring to FIG. 2, the method of purifying waste hydrochloric acid of the present invention may further include a step of purifying the organic solvent used in the waste hydrochloric acid, in order to increase regeneration efficiency of the organic solvent used in the purification of the waste hydrochloric acid.

That is, after the obtaining of the purified hydrochloric acid (S4), the method of purifying waste hydrochloric acid of the present invention may further include the steps of:
  removing the residual metallic components in the organic solvent by adding distilled water to the organic solvent containing the metallic components which is separated in the separating (S3) (S5);
  separating (fractionating) a water layer and the organic solvent having the metallic components removed therefrom (S6); and
  recovering the separated organic solvent and water layer, respectively (S7).

That is, in the method of the present invention, after the organic solvent, which is separated and recovered after the purification of the waste hydrochloric acid, is again put into the reactor, the step of removing the metallic components remaining in the organic solvent by adding distilled water may be performed (S5).

The residual metallic components in the organic solvent may be extracted with water in the removing.

In this case, the organic solvent and the distilled water may be mixed in a volume ratio of 1:0.1 to 1:1, for example, 1:1. In a case in which the distilled water is added at a volume ratio of less than 0.1, an effect of extracting the metallic components may be reduced, and, in a case in which the distilled water is added at a volume ratio of greater than 1 (1/1), phase separation may not occur due to the generation of an emulsion.

The removing (S5) may be performed for 10 seconds to 60 seconds, for example, 20 seconds to 60 seconds, while a mixed solution of the separated organic solvent and the distilled water is stirred at a speed of 200 rpm to 600 rpm at atmospheric temperature.

In this case, the expression "atmospheric temperature", as an annual average normal temperature or an ambient temperature, specifically denotes a temperature range of 20±5° C.

In a case in which the stirring speed is less than 200 rpm, since the mixing is not done smoothly, the extraction efficiency of the metallic components may be reduced. Also, in a case in which the stirring speed is greater than 600 rpm, the effect of extracting the metallic components is insignificant, but energy consumption may be increased.

In a case in which the stirring time for the removal is less than 20 seconds, since sufficient time to extract metals is not secured, the metallic component extraction efficiency may be reduced. An amount of the extracted metallic component may not be significantly different even if the stirring time is greater than 60 seconds, but an amount of the processable waste organic solvent is limited, and thus, process time and costs may be increased.

In the removing (S5), various mixing devices may be used, and, as a typical example, the stirring may be performed by using a magnetic stirrer plate or a static mixer.

Next, referring to FIG. 2, in the method of the present invention, after the stirring has reached equilibrium, the mixed solution of the organic solvent and the distilled water is put into a separator, shaken, and then settled so that the mixed solution is separated (fractionated) into an organic solvent having the metallic components removed therefrom and a distilled water layer containing the iron (Fe) ion component (S6).

In this case, the separating may be performed within 20 seconds.

Subsequently, in the method of the present invention, the distilled water layer, as an extract separated and disposed on a lower end, may be removed, and an organic phase used in the purification of the waste hydrochloric acid may be effectively regenerated by recovering the organic layer that is disposed on an upper end (S7).

In this case, a degree of regeneration efficiency of the organic solvent according to the method of the present invention may be confirmed by measuring concentrations of the residual metals contained in the recovered organic solvent and the water layer.

As described above, with respect to the method of purifying waste hydrochloric acid using a solvent extraction method according to the method of the present invention, since the method may effectively remove the iron (Fe) ion component from the waste hydrochloric acid, the process may be simplified and the resulting effect of reducing energy and manufacturing costs may be obtained. Furthermore, in the method of the present invention, since the organic solvent may be repeatedly used several times by further including the step of regenerating the organic solvent used in the method of purifying waste hydrochloric acid, process operating costs may be significantly reduced in comparison to a conventional process.

EXAMPLES

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Example 1

A concentration of an iron (Fe) ion component included in 100 ml of waste hydrochloric acid was measured by inductively coupled plasma mass spectrometry (S0).

Subsequently, trioctylamine, as an extractant, (the iron (Fe) ion component included in the waste hydrochloric acid:the extractant=1 mole:40 moles) was dissolved in 100 ml of toluene, as an organic solvent, to prepare an extraction solution (S1).

Next, the extraction solution was added to 100 ml of the waste hydrochloric acid, and metallic components contained in the waste hydrochloric acid were extracted with the organic solvent while stirring at a speed of 200 rpm for 60 seconds at atmospheric temperature (S2).

After the stirring has reached equilibrium, a mixed solution of the organic solvent and the waste hydrochloric acid was put into a separator, shaken for about 20 seconds, and then settled so that the mixed solution was separated (fractionated) into an organic solvent containing the metallic components and a waste hydrochloric acid layer (S3).

Subsequently, purified hydrochloric acid was obtained by recovering the separated waste hydrochloric acid layer (S4) (see FIG. 3).

Residual metal concentrations in the purified hydrochloric acid and TOC were measured, and the results thereof are presented in the following Tables 1 and 2.

In this case, the residual metal concentrations were measured by using inductively coupled plasma atomic emission spectroscopy (ICP-OES), and a total organic carbon (TOC) component was analyzed by a TOC analyzer.

Example 2

Purified hydrochloric acid was obtained in the same manner as in Example 1 except that the extractant was used in an amount such that a molar ratio of Fe included in the waste hydrochloric acid:the extractant was 1:60 in step S1 of Example 1. Residual metal concentrations in the purified hydrochloric acid were measured, and the results thereof are presented in the following Table 1.

Example 3

Purified hydrochloric acid was obtained in the same manner as in Example 1 except that cyclohexane was used instead of the toluene in Example 1. Residual metal concentrations in the purified hydrochloric acid and TOC were measured, and the results thereof are presented in the following Tables 1 and 2.

Example 4

Purified hydrochloric acid was obtained in the same manner as in Example 3 except that the waste hydrochloric acid layer separated in Example 3 was again extracted by using cyclohexane in which 40 moles of the extractant was dissolved (S2). Residual metal concentrations in the purified hydrochloric acid and TOC were measured, and the results thereof are presented in the following Tables 1 and 2.

Example 5

Purified hydrochloric acid was obtained in the same manner as in Example 1 except that xylene was used instead of the toluene in Example 1. Residual metal concentrations in the purified hydrochloric acid and TOC were measured, and the results thereof are presented in the following Tables 1 and 2.

Example 6

Purified hydrochloric acid was obtained in the same manner as in Example 1 except that the waste hydrochloric acid layer separated in Example 5 was again extracted by using xylene in which 40 moles of the extractant was dissolved (S2). Residual metal concentrations in the purified hydrochloric acid and TOC were measured, and the results thereof are presented in the following Tables 1 and 2.

Example 7

Purified hydrochloric acid was obtained in the same manner as in Example 1 except that a mixed solution of octane and 2-ethylhexanol (volume ratio of 1:1) was used instead of the toluene in Example 1. Residual metal concentrations in the purified hydrochloric acid and TOC were measured, and the results thereof are presented in the following Tables 1 and 2.

Example 8

Purified hydrochloric acid was obtained in the same manner as in Example 1 except that a mixed solution of decane and 2-ethylhexanol (volume ratio of 1:1) was used instead of the toluene in Example 1. Residual metal concentrations in the purified hydrochloric acid and TOC were measured, and the results thereof are presented in the following Tables 1 and 2.

Example 9

Purified hydrochloric acid was obtained in the same manner as in Example 1 except that a mixed solution of dodecane and 2-ethylhexanol (volume ratio of 1:1) was used instead of the toluene in Example 1. Residual metal concentrations in the purified hydrochloric acid and TOC were measured, and the results thereof are presented in the following Tables 1 and 2.

Example 10

Purified hydrochloric acid was obtained in the same manner as in Example 1 except that a mixed solution of kerosene and 2-ethylhexanol (volume ratio of 1:1) was used instead of the toluene in Example 1. Residual metal concentrations in the purified hydrochloric acid and TOC were measured, and the results thereof are presented in the following Tables 1 and 2.

Example 11

Purified hydrochloric acid was obtained in the same manner as in Example 1 except that a mixed solution of kerosene and 2-dodecanol (volume ratio of 1:1) was used instead of the toluene in Example 1. Residual metal concentrations in the purified hydrochloric acid and TOC were measured, and the results thereof are presented in the following Tables 1 and 2.

Example 12

Purified hydrochloric acid was obtained in the same manner as in Example 1 except that, as an extractant, trialkylphosphine oxide, instead of the trioctylamine, was dissolved to prepare an extraction solution in step S1 of Example 1. Residual metal concentrations in the purified hydrochloric acid and TOC were measured, and the results thereof are presented in the following Tables 1 and 2.

Example 13

Purified hydrochloric acid was obtained in the same manner as in Example 3 except that, as an extractant, trialkylphosphine oxide, instead of the trioctylamine, was dissolved to prepare an extraction solution in step S1 of Example 3. Residual metal concentrations in the purified hydrochloric acid and TOC were measured, and the results thereof are presented in the following Tables 1 and 2.

Example 14

Purified hydrochloric acid was obtained in the same manner as in Example 1 except that methylcyclohexane was used instead of the toluene during the preparation of the extraction solution in step S1 of Example 1. Residual metal concentrations in the purified hydrochloric acid and TOC were measured, and the results thereof are presented in the following Tables 1 and 2.

Comparative Example 1

10 wt % of an ion exchange resin (IRA-900) was added to 100 ml of waste hydrochloric acid and stirred at a speed of 200 rpm for 1 hour at atmospheric temperature. Subsequently, the reactant was filtered to remove the ion exchange resin, and purified hydrochloric acid was obtained.

Residual metal concentrations in the purified hydrochloric acid were measured, and the results thereof are presented in the following Table 1.

Comparative Example 2

Purified hydrochloric acid was obtained in the same manner as in Comparative Example 1 except that an ion exchange resin (IRA-910) was used instead of the ion exchange resin (IRA-900) in Comparative Example 1. Residual metal concentrations in the purified hydrochloric acid were measured, and the results thereof are presented in the following Table 1.

Comparative Example 3

After $NaSO_3$ was added to 100 ml of waste hydrochloric acid to remove free residual hydrochloric acid and the mixture was stirred at a speed of 200 rpm for 1 hour at atmospheric temperature, 10 wt % of an ion exchange resin (IRA-910) was added to the mixture and stirred at a speed of 200 rpm for 1 hour at atmospheric temperature.

Subsequently, the ion exchange resin was removed by filtering the reactant, and purified hydrochloric acid was obtained. Residual metal concentrations in the purified hydrochloric acid were measured, and the results thereof are presented in the following Table 1.

Comparative Example 4

After 20 wt % of activated carbon was added to 100 ml of waste hydrochloric acid and the mixture was stirred at a speed of 200 rpm for 1 hour at atmospheric temperature, the activated carbon was removed by filtering the reactant.

10 wt % of an ion exchange resin (IRA-910) was added to 100 ml of the waste hydrochloric acid obtained by the filtering process and stirred at a speed of 200 rpm for 1 hour at atmospheric temperature.

Subsequently, the ion exchange resin was removed by filtering the reactant, and purified hydrochloric acid was obtained.

Residual metal concentrations in the purified hydrochloric acid and TOC were measured, and the results thereof are presented in the following Tables 1 and 2.

TABLE 1

|  | Extraction solution | | Al | Ca | Fe | K | Mg |
|---|---|---|---|---|---|---|---|
|  | Extractant | Organic solvent |  |  |  |  |  |
| Waste hydrochloric acid | — | — | 5 | 15 | 20 | 5 | 5 |
| Example 1 | Trioctylamine | Toluene | 6 | 16 | <0.1 | 5 | 5 |
| Example 2 | Trioctylamine | Toluene | 6 | 17 | <0.1 | 5 | 5 |
| Example 3 | Trioctylamine | Cyclohexane | 5 | 16 | <0.1 | 5 | 5 |
| Example 4 | Trioctylamine | Cyclohexane (two times) | 5 | 16 | <0.1 | 5 | 5 |
| Example 5 | Trioctylamine | Xylene | 6 | 16 | <0.1 | 5 | 5 |
| Example 6 | Trioctylamine | Xylene (two times) | 6 | 17 | <0.1 | 5 | 5 |
| Example 7 | Trioctylamine | Octane + 2-ethylhexanol | 7 | 17 | <0.1 | 5 | 5 |
| Example 8 | Trioctylamine | Decane + 2-ethylhexanol | 7 | 16 | <0.1 | 5 | 5 |

TABLE 1-continued

| | Extraction solution | | Al | Ca | Fe | K | Mg |
|---|---|---|---|---|---|---|---|
| | Extractant | Organic solvent | | | | | |
| Example 9 | Trioctylamine | Dodecane + 2-ethylhexanol | 7 | 16 | <0.1 | 5 | 5 |
| Example 10 | Trioctylamine | Kerosene + 2-ethylhexanol | 7 | 17 | <0.1 | 6 | 5 |
| Example 11 | Trioctylamine | Kerosene + 2-dodecanol | 6 | 16 | 1 | 5 | 5 |
| Example 12 | Trialkylphosphine oxide | Toluene | 3 | 16 | <0.1 | 3 | 4 |
| Example 13 | Trialkylphosphine oxide | Cyclohexane | 4 | 16 | <0.1 | 4 | 5 |
| Example 14 | Trioctylamine | Methylcyclohexane | 2 | 8 | <0.1 | 3 | 2 |
| Comparative Example 1 | — | — | 4 | 16 | 4 | 4 | 5 |
| Comparative Example 2 | — | — | 4 | 16 | 4 | 4 | 5 |
| Comparative Example 3 | — | — | 4 | 18 | 4 | 4 | 6 |
| Comparative Example 4 | — | — | N.D | N.D | 21 | N.D | N.D |

* metallic component concentration unit (ppm)

As illustrated in Table 1, with respect to Examples 1 to 14 which used the solvent extraction method of the present invention, it may be confirmed that the concentrations of the residual iron (Fe) component were 1 ppm or less (removal of 95% or more) regardless of the type of the organic solvent.

Furthermore, since $FeCl_4^-$ and $FeCl_3$, as components having a yellow color of the waste hydrochloric acid, were removed together during the purification process, it may be confirmed that color of the waste hydrochloric acid changed to transparent after the purification (see FIG. 3).

In contrast, with respect to Comparative Examples 1 to 3 which used the ion exchange resins to remove the iron (Fe) ion component in the waste hydrochloric acid, it may be confirmed that the concentrations of the residual iron (Fe) ion component were 1 ppm or more (removal of about 80%). In particular, with respect to Comparative Example 3 in which $NaSO_3$ was added to remove the free residual hydrochloric acid, it was confirmed that there was no effect on Fe removal efficiency.

Also, with respect to Comparative Example 4 in which the ion exchange resin was used after the activated carbon treatment, it was confirmed that the concentration of Fe was increased in comparison to those of Comparative Examples 1 and 2. It may be predicted that this result was due to the fact that an excessive amount of metallic impurities was included in the activated carbon and discharged

TABLE 2

| | Extraction solution | | TOC | TIC | TC |
|---|---|---|---|---|---|
| | Extractant | Organic solvent | (total organic carbon) | (total inorganic carbon) | (total carbon) |
| Waste hydrochloric acid | — | — | 67.65 | 54.64 | 122.29 |
| Example 1 | Trioctylamine | Toluene | 5.22 | 64.18 | 69.4 |
| Example 3 | Trioctylamine | Cyclohexane | 37.1 | 54.17 | 91.27 |
| Example 4 | Trioctylamine | Cyclohexane (two times) | 14.27 | 53.85 | 68.12 |
| Example 5 | Trioctylamine | Xylene | 40.7 | 54.4 | 95.1 |
| Example 6 | Trioctylamine | Xylene (two times) | 6.28 | 63.7 | 69.98 |
| Example 7 | Trioctylamine | Octane + 2-ethylhexanol | 45.93 | 54.84 | 100.77 |
| Example 8 | Trioctylamine | Decane + 2-ethylhexanol | 65.48 | 140.56 | 206.04 |
| Example 9 | Trioctylamine | Dodecane + 2-ethylhexanol | 66.15 | 145.06 | 211.21 |
| Example 10 | Trioctylamine | Kerosene + 2-ethylhexanol | 59.51 | 144.24 | 203.85 |
| Example 11 | Trioctylamine | Kerosene + 2-dodecanol | 53.51 | 55.05 | 108.56 |
| Example 14 | Trioctylamine | Methylcyclohexane | 53.58 | 151.7 | 205.28 |
| Comparative Example 4 | — | — | 18.79 | 54.78 | 73.57 |

Also, as illustrated in Table 2, when TOC values of the purified hydrochloric acid recovered after the extraction were compared, the value obtained when the toluene was used in the extraction solution was 5.22, wherein it was the lowest TOC content. From this result, since phase separation was most effectively performed when the toluene was used, it may be understood that organic impurities were not included in the waste hydrochloric acid after the phase separation.

Example 15

Purified hydrochloric acid was obtained in the same manner as in Example 1 except that a volume of the organic solvent used was 50 ml instead of 100 ml in Example 1. Residual metal concentrations in the purified hydrochloric acid were measured, and the results thereof are presented in the following Table 3.

Example 16

Purified hydrochloric acid was obtained in the same manner as in Example 1 except that a volume of the organic solvent used was 30 ml instead of 100 ml in Example 1. Residual metal concentrations in the purified hydrochloric acid were measured, and the results thereof are presented in the following Table 3.

Example 17

Purified hydrochloric acid was obtained in the same manner as in Example 1 except that a volume of the organic solvent used was 10 ml instead of 100 ml in Example 1. Residual metal concentrations in the purified hydrochloric acid were measured, and the results thereof are presented in the following Table 3.

Comparative Example 5

In a case in which a volume of the organic solvent used was 9 ml instead of 100 ml in Example 1, phase separation was not easy while an emulsion phenomenon occurred in the waste hydrochloric acid layer.

TABLE 3

|  | Organic solvent content (ml) | Al | Ca | Fe | K | Mg |
| --- | --- | --- | --- | --- | --- | --- |
| Waste hydrochloric acid | — | 5 | 15 | 20 | 5 | 5 |
| Example 15 | 50 | 4 | 16 | <0.1 | 4 | 5 |
| Example 16 | 30 | 4 | 16 | <0.1 | 4 | 5 |
| Example 17 | 10 | 4 | 16 | <0.1 | 4 | 5 |
| Comparative Example 5 | 9 | — | — | — | — | — |

As illustrated in Table 3, as a result of measuring changes in the concentration of the iron (Fe) ion component while changing a mixing ratio of the extraction solution to the waste hydrochloric acid, it may be understood that the Fe removal efficiency was not reduced even if the amount of the organic solvent used in the extraction solution was reduced.

Since the phase separation itself was difficult due to the occurrence of the emulsion phenomenon when the mixing ratio of the organic solvent/the waste hydrochloric acid was 1/10 or less as in Comparative Example 5, it was confirmed that high purification of the hydrochloric acid was difficult.

Example 18

Purified hydrochloric acid was obtained in the same manner as in Example 1 except that the extraction was performed while stirring the organic solvent and the waste hydrochloric acid for 50 seconds in Example 1. Residual metal concentrations in the purified hydrochloric acid were measured, and the results thereof are presented in the following Table 4.

Example 19

Purified hydrochloric acid was obtained in the same manner as in Example 1 except that the extraction was performed while stirring the organic solvent and the waste hydrochloric acid for 30 seconds in Example 1. A concentration of the iron (Fe) ion component in the purified hydrochloric acid was measured, and the results thereof are presented in the following Table 4.

Example 20

Purified hydrochloric acid was obtained in the same manner as in Example 1 except that the extraction was performed while stirring the organic solvent and the waste hydrochloric acid for 20 seconds in Example 1. A concentration of the iron (Fe) ion component in the purified hydrochloric acid was measured, and the results thereof are presented in the following Table 4.

Example 21

Purified hydrochloric acid was obtained in the same manner as in Example 1 except that the extraction was performed while stirring the organic solvent and the waste hydrochloric acid for 10 seconds in Example 1. A concentration of the iron (Fe) ion component in the purified hydrochloric acid was measured, and the results thereof are presented in the following Table 4.

TABLE 4

|  | Stirring time (sec) | Fe |
| --- | --- | --- |
| Waste hydrochloric acid | — | 20 |
| Example 18 | 50 | <0.1 |
| Example 19 | 30 | <0.1 |
| Example 20 | 20 | <0.1 |
| Example 21 | 10 | 0.1 |

As illustrated in FIG. 4, as a result of measuring changes in the concentration of the iron (Fe) ion component while changing the mixing time of the organic solvent and the waste hydrochloric acid, it may be understood that the efficiency of removing Fe in the waste hydrochloric acid was excellent even if the extraction time was reduced to 20 seconds.

However, in a case in which the extraction time was set as 10 seconds, since the Fe removal efficiency was reduced, it may be understood that 1 ppm or less of Fe was detected.

Example 22

Purified hydrochloric acid was obtained in the same manner as in Example 1 except that stirring of the organic solvent and the waste hydrochloric acid for the extraction was performed at a speed of 600 rpm instead of 200 rpm in Example 1. Residual metal concentrations in the purified hydrochloric acid were measured, and the results thereof are presented in the following Table 5.

Example 23

Purified hydrochloric acid was obtained in the same manner as in Example 1 except that stirring of the organic solvent and the waste hydrochloric acid for the extraction was performed at a speed of 300 rpm instead of 200 rpm in Example 1. Residual metal concentrations in the purified hydrochloric acid were measured, and the results thereof are presented in the following Table 5.

Example 24

Purified hydrochloric acid was obtained in the same manner as in Example 1 except that stirring of the organic solvent and the waste hydrochloric acid for the extraction was performed at a speed of 100 rpm instead of 200 rpm in Example 1. Residual metal concentrations in the purified hydrochloric acid were measured, and the results thereof are presented in the following Table 5.

TABLE 5

| | Stirring speed (rpm) | Al | Ca | Fe | K | Mg |
|---|---|---|---|---|---|---|
| Waste hydrochloric acid | — | 5 | 15 | 20 | 5 | 5 |
| Example 22 | 600 | 1 | 7 | <0.1 | 2 | 2 |
| Example 23 | 300 | 1 | 7 | <0.1 | 2 | 2 |
| Example 24 | 100 | 1 | 7 | 0.7 | 2 | 2 |

As illustrated in Table 5, as a result of lowering the stirring speed during the stirring process for the extraction, since interlayer mixing was not facilitated when the stirring was performed at a speed of 100 rpm which was lower than 200 rpm, it may be understood that, as a result of ICP measurement, about 0.7 ppm of Fe was detected.

Example 25

After a concentration of an iron (Fe) ion component included in 100 ml of waste hydrochloric acid was measured, trioctylamine, as an extractant, (Fe included in the waste hydrochloric acid:the extractant=1 mole:40 moles) was dissolved in 100 ml of toluene, as an organic solvent, to prepare an extraction solution (S1).

Subsequently, the extraction solution was added to 100 ml of the waste hydrochloric acid, and metallic components contained in the waste hydrochloric acid were extracted with the organic solvent while stirring at a speed of 200 rpm for 60 seconds at atmospheric temperature (S2).

After the stirring has reached equilibrium, a mixed solution of the organic solvent and the waste hydrochloric acid was put into a separator, shaken for about 20 seconds, and then settled so that the mixed solution was separated (fractionated) into an organic solvent containing the metallic components and a waste hydrochloric acid layer (S3).

Subsequently, purified hydrochloric acid (1) was obtained by recovering the separated waste hydrochloric acid layer (S4).

Subsequently, 100 ml of distilled water was added to the separated organic solvent, and the residual metallic components in the organic solvent were removed while stirring at a speed of 200 rpm for 1 hour at atmospheric temperature (S5).

After the completion of the stirring, a mixed solution of the organic solvent (1) having the metallic components removed therefrom and the water layer was put into a separator and separated for about 20 seconds to be fractionated into an organic solvent and a water layer (S6). The separated water layer (1) was recovered (S7).

Residual metal concentrations in the purified hydrochloric acid (1) and the water layer (1) were measured, and the results thereof are presented in the following Table 6.

Example 26

The organic solvent (1) separated from the waste hydrochloric acid layer of Example 25 and recovered was reintroduced into 100 ml of waste hydrochloric acid, and metallic components contained in the waste hydrochloric acid were extracted with the organic solvent while stirring at a speed of 200 rpm for 1 hour at atmospheric temperature (S2-2).

After the stirring has reached equilibrium, a mixed solution of the reintroduced organic solvent (1) and the waste hydrochloric acid was put into a separator, shaken for about 20 seconds, and then settled so that the mixed solution was separated (fractionated) into an organic solvent containing the metallic components and a waste hydrochloric acid layer (S3-2).

Subsequently, purified hydrochloric acid (2) was obtained by recovering the separated waste hydrochloric acid layer (S4-2).

Subsequently, 100 ml of distilled water was added to the separated organic solvent, and the residual metallic components in the organic solvent were again removed while stirring at a speed of 200 rpm for 1 hour at atmospheric temperature (S5-2).

After the completion of the stirring, a mixed solution of the organic solvent (2) having the metallic components removed therefrom and the water layer was put into a separator and separated for about 20 seconds to be fractionated into an organic solvent and a water layer (S6-2). The separated water layer (2) was recovered (S7-2).

Residual metal concentrations in the purified hydrochloric acid (2) and the water layer (2) were measured, and the results thereof are presented in the following Table 6.

Example 27

The organic solvent (2) separated from the waste hydrochloric acid layer of Example 26 and recovered was reintroduced into 100 ml of waste hydrochloric acid, and metallic components contained in the waste hydrochloric acid were extracted with the organic solvent while stirring at a speed of 200 rpm for 1 hour at atmospheric temperature (S2-3).

After the stirring has reached equilibrium, a mixed solution of the reintroduced organic solvent and the waste hydrochloric acid was put into a separator, shaken for about 20 seconds, and then settled so that the mixed solution was separated (fractionated) into an organic solvent containing the metallic components and a waste hydrochloric acid layer (S3-3).

Subsequently, purified hydrochloric acid (3) was obtained by recovering the separated waste hydrochloric acid layer (S4-3).

Subsequently, 100 ml of distilled water was added to the separated organic solvent, and the residual metallic components in the organic solvent were removed while stirring at a speed of 200 rpm for 1 hour at atmospheric temperature (S5-3).

After the completion of the stirring, a mixed solution of the organic solvent (3) having the metallic components removed therefrom and the water layer was put into a separator and separated for about 20 seconds to be fractionated into an organic solvent and a water layer (S6-3). The separated water layer (3) was recovered (S7-3).

Residual metal concentrations in the purified hydrochloric acid (3) and the water layer (3) were measured, and the results thereof are presented in the following Table 6.

Example 28

The organic solvent (3) separated from the waste hydrochloric acid layer of Example 27 and recovered was reintroduced into 100 ml of waste hydrochloric acid, and metallic components contained in the waste hydrochloric acid were extracted with the organic solvent while stirring at a speed of 200 rpm for 1 hour at atmospheric temperature (S2-4).

After the stirring has reached equilibrium, a mixed solution of the reintroduced organic solvent and the waste hydrochloric acid was put into a separator, shaken for about 20 seconds, and then settled so that the mixed solution was separated (fractionated) into an organic solvent containing the metallic components and a waste hydrochloric acid layer (S3-4).

Subsequently, purified hydrochloric acid (4) was obtained by recovering the separated waste hydrochloric acid layer (S4-4).

Subsequently, 100 ml of distilled water was added to the separated organic solvent, and the residual metallic components in the organic solvent were removed while stirring at a speed of 200 rpm for 1 hour at atmospheric temperature (S5-4).

After the completion of the stirring, a mixed solution of the organic solvent (4) having the metallic components removed therefrom and the water layer was put into a separator and separated for about 20 seconds to be fractionated into an organic solvent and a water layer (S6-4). The separated water layer (4) was recovered (S7-4).

Residual metal concentrations in the purified hydrochloric acid (4) and the water layer (4) were measured, and the results thereof are presented in the following Table 6.

TABLE 6

| | The number of extractions | Al | Ca | Fe | K | Mg |
|---|---|---|---|---|---|---|
| Waste hydrochloric acid | — | 5 | 15 | 20 | 5 | 5 |
| Example 25 | Purified hydrochloric acid (1) | 4 | 16 | <0.1 | 4 | 5 |
| | Water layer (1) | 0.6 | 0.2 | 20 | 0.3 | <0.1 |
| Example 26 | Purified hydrochloric acid (2) | 4 | 16 | <0.1 | 4 | 5 |
| | Water layer (2) | 0.5 | 0.2 | 21 | 0.2 | <0.1 |
| Example 27 | Purified hydrochloric acid (3) | 4 | 16 | <0.1 | 4 | 5 |
| | Water layer (3) | 0.5 | 0.2 | 21 | 0.2 | <0.1 |
| Example 28 | Purified hydrochloric acid (4) | 4 | 16 | <0.1 | 4 | 5 |
| | Water layer (4) | 0.5 | 0.2 | 21 | 0.2 | <0.1 |

As illustrated in Table 6, as a result of repeating the waste hydrochloric acid purification process several times using the organic solvent having the metallic components removed therefrom, it may be understood that the iron (Fe) ion component in the waste hydrochloric acid was constantly removed to a concentration of 0.1 ppm or less.

That is, it may be understood that there was no significant difference from the effect of purifying waste hydrochloric acid of Example 25 even if the organic solvent was purified and used several times in the waste hydrochloric acid purification step (metallic component extraction step) as in Examples 26 to 28. Thus, with respect to the method of purifying waste hydrochloric acid of the present invention, it may be confirmed that the organic solvent may be effectively regenerated and used.

Example 29

After a concentration of an iron (Fe) ion component included in 100 ml of waste hydrochloric acid was measured, trialkylphosphine oxide, as an extractant, (Fe included in the waste hydrochloric acid:the extractant=1 mole:40 moles) was dissolved in 100 ml of toluene, as an organic solvent, to prepare an extraction solution (S'1).

Subsequently, the extraction solution was added to 100 ml of the waste hydrochloric acid, and metallic components contained in the waste hydrochloric acid were extracted with the organic solvent while stirring at a speed of 200 rpm for 60 seconds at atmospheric temperature (S'2).

After the stirring has reached equilibrium, a mixed solution of the organic solvent and the waste hydrochloric acid was put into a separator, shaken for about 20 seconds, and then settled so that the mixed solution was separated (fractionated) into an organic solvent containing the metallic components and a waste hydrochloric acid layer (S'3).

Subsequently, purified hydrochloric acid (1) was obtained by recovering the separated waste hydrochloric acid layer (S'4).

Subsequently, 100 ml of distilled water was added to the separated organic solvent, and the residual metallic components in the organic solvent were removed while stirring at a speed of 200 rpm for 1 hour at atmospheric temperature (S'5).

After the completion of the stirring, a mixed solution of the organic solvent and the water layer was put into a separator and separated for about 20 seconds to be fractionated into an organic solvent and a water layer (S'6). The separated water layer (1) was recovered (S'7).

Residual metal concentrations in the purified organic solvent and the water layer (1) were measured, and the results thereof are presented in the following Table 7.

Example 30

After a concentration of an iron (Fe) ion component included in 100 ml of waste hydrochloric acid was measured, trialkylphosphine oxide, as an extractant, (Fe included in the waste hydrochloric acid:the extractant=1 mole:40 moles) was dissolved in 100 ml of cyclohexane, as an organic solvent, to prepare an extraction solution (S'1).

Subsequently, the extraction solution was added to 100 ml of the waste hydrochloric acid, and metallic components contained in the waste hydrochloric acid were extracted with the organic solvent while stirring at a speed of 200 rpm for 60 seconds at atmospheric temperature (S'2).

After the stirring has reached equilibrium, a mixed solution of the organic solvent and the waste hydrochloric acid was put into a separator, shaken for about 20 seconds, and then settled so that the mixed solution was separated (fractionated) into an organic solvent containing the metallic components and a waste hydrochloric acid layer (S'3).

Subsequently, purified hydrochloric acid (1) was obtained by recovering the separated waste hydrochloric acid layer (S'4).

Subsequently, 100 ml of distilled water was added to the separated organic solvent, and the residual metallic components in the organic solvent were removed while stirring at a speed of 200 rpm for 1 hour at atmospheric temperature (S'5).

After the completion of the stirring, a mixed solution of the organic solvent and the water layer was put into a separator and separated for about 20 seconds to be fractionated into an organic solvent and a water layer (S'6). The separated water layer (1) was recovered (S'7).

Residual metal concentrations in the purified organic solvent and the water layer (1) were measured, and the results thereof are presented in the following Table 7.

TABLE 7

| | The number of extractions | Al | Ca | Fe | K | Mg |
|---|---|---|---|---|---|---|
| Waste hydrochloric acid | — | 5 | 15 | 20 | 5 | 5 |
| Example 29 | Organic solvent layer | 1 | <0.1 | 9 | 1 | 1 |
| | Water layer (1) | 0.4 | 0.2 | 11 | 0.3 | <0.1 |
| Example 30 | Organic solvent layer | <0.1 | <0.1 | 12 | <0.1 | <0.1 |
| | Water layer (1) | 0.4 | 0.1 | 8 | 0.2 | <0.1 |

As illustrated in Table 7, as a result of performing the removal process on the organic solvent and the purification process on the waste hydrochloric acid using the trialkylphosphine oxide as the extractant, the metallic component, particularly, the iron (Fe) ion component, in the waste hydrochloric acid was removed to a concentration of 1 ppm or less as illustrated in Table 1, but the removal was not effectively performed in the organic solvent layer, and thus, it may be understood that there were restrictions on reusing the organic solvent.

The invention claimed is:

1. A method of purifying waste hydrochloric acid, the method comprising steps of:
   preparing an extraction solution by dissolving an extractant in an organic solvent (S1);
   extracting metallic components in waste hydrochloric acid with the extraction solution by adding the extraction solution to the waste hydrochloric acid, wherein the extracting is performed for 20 seconds to 60 seconds at atmospheric temperature while stirring a mixed solution of the waste hydrochloric acid and the extraction solution at a speed of 200 rpm to 600 rpm (S2);
   separating a waste hydrochloric acid layer and the extraction solution containing the metallic components (S3); and
   obtaining purified hydrochloric acid by recovering the separated (fractionated) waste hydrochloric acid layer (S4),
   wherein the organic solvent comprises 1) at least one solvent selected from the group consisting of an aromatic hydrocarbon solvent, and an aliphatic hydrocarbon solvent, and 2) an alcohol,
   wherein an amount of the extractant used is 50 to 60 moles based on 1 mole of an iron (Fe) ion component of the metallic components contained in the waste hydrochloric acid, and
   wherein the waste hydrochloric acid and the extraction solution are mixed in a volume ratio of 1:0.1 to 1:1.

2. The method of claim 1, further comprising a step of measuring a concentration of the iron (Fe) ion component of the metallic components contained in the waste hydrochloric acid (S0), before the preparing of the extraction solution.

3. The method of claim 1, wherein the aromatic hydrocarbon solvent comprises at least one selected from the group consisting of toluene and xylene,
   the aliphatic hydrocarbon solvent comprises at least one alicyclic hydrocarbon solvent selected from the group consisting of methyl cyclohexane and cyclohexane, or a linear hydrocarbon solvent having 6 to 20 carbon atoms, and
   the alcohol comprises a monovalent alcohol having 6 to 20 carbon atoms.

4. The method of claim 1, wherein the extractant comprises at least one compound selected from the group consisting of trioctylamine, methyl isobutyl ketone, trialkylphosphine oxide, and tributyl phosphate.

5. The method of claim 4, wherein the extractant comprises at least one compound selected from the group consisting of trioctylamine and methyl isobutyl ketone.

6. The method of claim 5, wherein the extractant is trioctylamine.

7. The method of claim 1, wherein the separating (S3) is performed within 20 seconds.

8. The method of claim 1, after the obtaining of the purified hydrochloric acid (S4), further comprising steps of:
   removing residual metallic components in the extraction solution by adding distilled water to the separated extraction solution containing the metallic components (S5);
   separating a water layer and the extraction solution having the metallic components removed therefrom (S6); and
   recovering the separated extraction solution and water layer, respectively (S7).

9. The method of claim 8, wherein the extraction solution and the distilled water are mixed in a volume ratio of 1:1.

10. The method of claim 8, wherein the removing (S5) is performed for 20 seconds to 60 seconds at atmospheric temperature while stirring a mixed solution of the separated extraction solution and the distilled water at a speed of 200 rpm to 600 rpm.

11. The method of claim 8, wherein the separating (S6) is performed within 20 seconds.

12. A method of purifying waste hydrochloric acid, the method comprising steps of:
   preparing an extraction solution by dissolving an extractant in an organic solvent (S1);
   extracting metallic components in waste hydrochloric acid with the extraction solution by adding the extraction solution to the waste hydrochloric acid (S2);
   separating a waste hydrochloric acid layer and the extraction solution containing the metallic components (S3); and
   obtaining purified hydrochloric acid by recovering the separated (fractionated) waste hydrochloric acid layer (S4),
   wherein an amount of the extractant used is 40 to 60 moles based on 1 mole of an iron (Fe) ion component of the metallic components contained in the waste hydrochloric acid, and
   wherein the waste hydrochloric acid and the extraction solution are mixed in a volume ratio of 1:0.1 to 1:1, and
   wherein the extractant comprises at least one compound selected from the group consisting of methyl isobutyl ketone, trialkylphosphine oxide, and tributyl phosphate, and
   wherein the organic solvent comprises 1) at least one solvent selected from the group consisting of an aromatic hydrocarbon solvent, and an aliphatic hydrocarbon solvent, and 2) an alcohol.

* * * * *